US012221279B1

(12) United States Patent
Gwon

(10) Patent No.: US 12,221,279 B1
(45) Date of Patent: Feb. 11, 2025

(54) METHOD FOR DETECTING COLLECTION WORK, AND DUMPSTER FOR EXECUTING THE SAME

(71) Applicant: ECUBE LABS CO., LTD., Seoul (KR)

(72) Inventor: Sun Beom Gwon, Seoul (KR)

(73) Assignee: ECUBE LABS CO., LTD., Seoul (KR)

( * ) Notice: Subject to any disclaimer, the term of this patent is extended or adjusted under 35 U.S.C. 154(b) by 0 days.

(21) Appl. No.: 18/899,255

(22) Filed: Sep. 27, 2024

(51) Int. Cl.
*B09B 3/00* (2022.01)
*B65F 1/14* (2006.01)

(52) U.S. Cl.
CPC .......... *B65F 1/14* (2013.01); *B65F 2210/128* (2013.01); *B65F 2210/168* (2013.01); *B65F 2210/182* (2013.01)

(58) Field of Classification Search
CPC . B09B 3/00; B65F 2210/168; B65F 2210/128
See application file for complete search history.

(56) References Cited

U.S. PATENT DOCUMENTS 11,386,362 B1 * 7/2022 Kim .................... G06Q 10/047
11,488,118 B1 * 11/2022 Patel .................... G06Q 10/30
11,702,280 B2 * 7/2023 Kurani .................. G06Q 10/08 705/308
11,788,877 B2 * 10/2023 Balachandran .... G06Q 30/0201 177/1
11,928,693 B1 * 3/2024 Savchenko ............ G06Q 50/26
11,977,381 B1 * 5/2024 Patel ......................... B65F 3/02
12,096,210 B2 * 9/2024 Salomon ............ G07C 9/00571
2021/0188541 A1 6/2021 Kurani et al.

FOREIGN PATENT DOCUMENTS

KR 10-2017-0084153 A 7/2017
KR 10-2424162 B1 7/2022
WO WO 2016/187677 A1 12/2016

* cited by examiner

*Primary Examiner* — Dalena Tran
(74) *Attorney, Agent, or Firm* — The PL Law Group, PLLC

(57) ABSTRACT

A dumpster includes a sensor module including a first sensor module detecting an impact or vibration applied to the dumpster, a second sensor module detecting an inclination of the dumpster, and a third sensor module detecting a loading amount of waste loaded in the dumpster, and a dumpster hole that is provided on both sides of the dumpster and to which an end of a front loader provided on the waste collection vehicle is docked in a collection work by the waste collection vehicle.

2 Claims, 10 Drawing Sheets

METHOD FOR DETECTING COLLECTION WORK, AND DUMPSTER FOR EXECUTING THE SAME

CROSS-REFERENCE TO RELATED APPLICATION AND CLAIM OF PRIORITY

This application claims the benefit under 35 USC § 119 of Korean Patent Application No. 10-2023-0131458, filed on Oct. 4, 2023, in the Korean Intellectual Property Office, the entire disclosure of which is incorporated herein by reference for all purposes.

BACKGROUND

The present disclosure relates to a technology for detecting a dumpster in a process of being collected by a waste collection vehicle, and more particularly, to a technology for sequentially controlling an operation of low-power sensors in the dumpster for detection of collection work.

The dumpster is a mobile container for loading waste, which can be transported to a waste disposal site by the waste collection vehicle or lifted on the spot by the waste collection vehicle and then emptied. To this end, the waste collection vehicle is provided with a front loader on the front thereof, and the dumpster is provided with a dumpster hole for docking of the front loader. A worker may dock the front loader to the dumpster hall by manipulating an input means (e.g., a joystick) provided on the waste collection vehicle and then collect the dumpster.

However, in the past, whether the collection work has been actually performed normally had to depend on the statements of a worker (i.e., a collector) or a discharger. In addition, there are increasing cases of determining whether the collection work is performed by installing low-power sensors such as infrared sensors and ultrasonic sensors inside the dumpster and detecting a loading amount of waste loaded in the dumpster through the low-power sensors, but when these low-power sensors are operated at all times, there is a problem of power waste due to excessive power use. In addition, when the low-power sensors are operated periodically at fixed time intervals, there is an advantage of minimizing power waste, but there is a problem that the collection work performed at times other than the periodic operation time cannot be properly detected.

SUMMARY

The present disclosure provides a method for detecting collection work and a dumpster for executing the same that prevent excessive power use of low-power sensors in the dumpster in the process of collecting the dumpster by a waste collection vehicle, and at the same time detect whether irregular collection work is performed at any time as it comes.

In accordance with an exemplary embodiment of the present invention, there is provided a dumpster that is provided with a plurality of different types of sensors and detects collection work by a waste collection vehicle using the sensors, the dumpster including a sensor module that includes a first sensor module detecting an impact or vibration applied to the dumpster, a second sensor module detecting an inclination of the dumpster, and a third sensor module detecting a loading amount of waste loaded in the dumpster, and a dumpster hole that is provided on both sides of the dumpster and to which an end of a front loader provided on the waste collection vehicle is docked in a collection work by the waste collection vehicle, in which the first sensor module to the third sensor module sequentially operate as the collection work by the waste collection vehicle is performed while the end of the front loader is docked to the dumpster hole.

The second sensor module may maintain a sleep mode, and switch to an operating mode when an impact or vibration of which magnitude is greater than or equal to a level set by the first sensor module is detected to detect an inclination of the dumpster.

The third sensor module may maintain a sleep mode, and switch to an operating mode when a change in inclination of the dumpster is detected by the second sensor module to detect a loading amount of waste loaded in the dumpster.

The third sensor module may be switched to an operating mode only when the change in inclination of the dumpster in each of the X-axis, Y-axis, and Z-axis directions is detected by the second sensor module to detect the loading amount of waste loaded in the dumpster.

The third sensor module may include a first loading-amount sensor including at least one of an infrared sensor, an ultrasonic sensor, and a time of flight (ToF) sensor and a second loading-amount sensor that photographs the waste in the dumpster and obtains a loading image.

The sensor module may further include a communication module for transmitting sensor data acquired by the first loading-amount sensor and the loading image acquired by the second loading-amount sensor to a server, and the communication module may be activated only when the change in inclination of the dumpster in the X-axis, Y-axis, and Z-axis directions is detected by the second sensor module, so that the sensor data and the loading image may be transmitted to the server.

In accordance with another exemplary embodiment of the present invention, there is provided a method for detecting collection work of a dumpster including a plurality of different types of sensors by a waste collection vehicle, the method including providing a sensor module that includes a first sensor module detecting an impact or vibration applied to the dumpster, a second sensor module detecting an inclination of the dumpster, and a third sensor module detecting a loading amount of waste loaded in the dumpster on the dumpster, providing a dumpster hole on both sides of the dumpster, docking an end of a front loader provided on the waste collection vehicle to the dumpster hole, and sequentially operating the first sensor module to the third sensor module as the collection work by the waste collection vehicle is performed while the end of the front loader is docked to the dumpster hole.

In the sequentially operating the first sensor module to the third sensor module, the second sensor module may maintain a sleep mode, and switch to an operating mode when an impact or vibration of which magnitude is greater than or equal to a level set by the first sensor module is detected to detect an inclination of the dumpster.

In the sequentially operating the first sensor module to the third sensor module, the third sensor module may maintain a sleep mode, and switch to an operating mode when a change in inclination of the dumpster is detected by the second sensor module to detect a loading amount of waste loaded in the dumpster.

In the sequentially operating the first sensor module to the third sensor module, the third sensor module may be switched to an operating mode only when the change in inclination of the dumpster in each of the X-axis, Y-axis, and Z-axis directions is detected by the second sensor module to detect the loading amount of waste loaded in the dumpster.

The third sensor module may include a first loading-amount sensor including at least one of an infrared sensor, an ultrasonic sensor, and a time of flight (ToF) sensor and a second loading-amount sensor that photographs the waste in the dumpster and obtains a loading image.

The sensor module may further include a communication module for transmitting sensor data acquired by the first loading-amount sensor and the loading image acquired by the second loading-amount sensor to a server, and the method for detecting collection work may further include, after the sequentially operating the first sensor module to the third sensor module, activating the communication module only when the change in inclination of the dumpster in the X-axis, Y-axis and Z-axis directions is detected by the second sensor module, so that the sensor data and the loading image are transmitted to the server.

BRIEF DESCRIPTION OF THE DRAWINGS

Exemplary embodiments can be understood in more detail from the following description taken in conjunction with the accompanying drawings, in which.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or workers. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Figure 1:
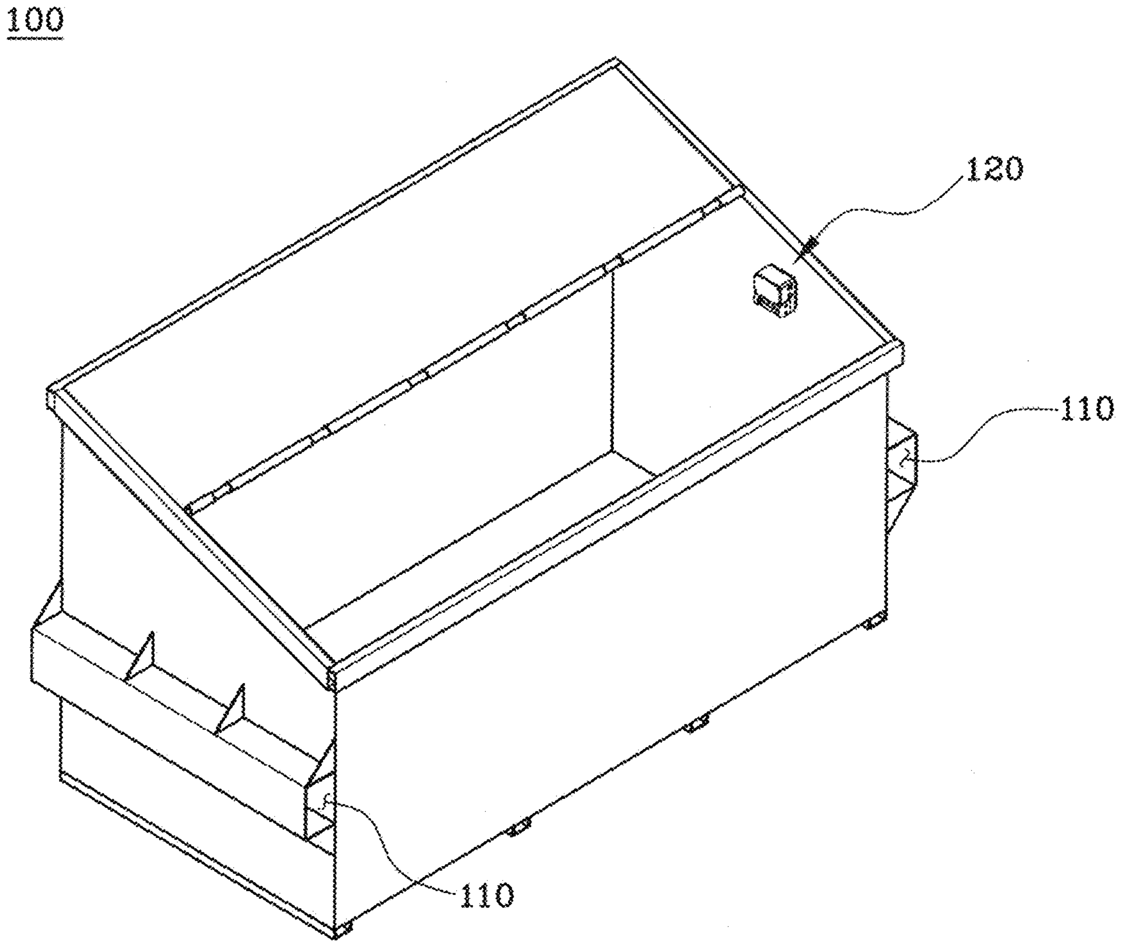
FIG. 1 is a perspective view of a dumpster in accordance with an exemplary embodiment of the present invention.
Figure 2:
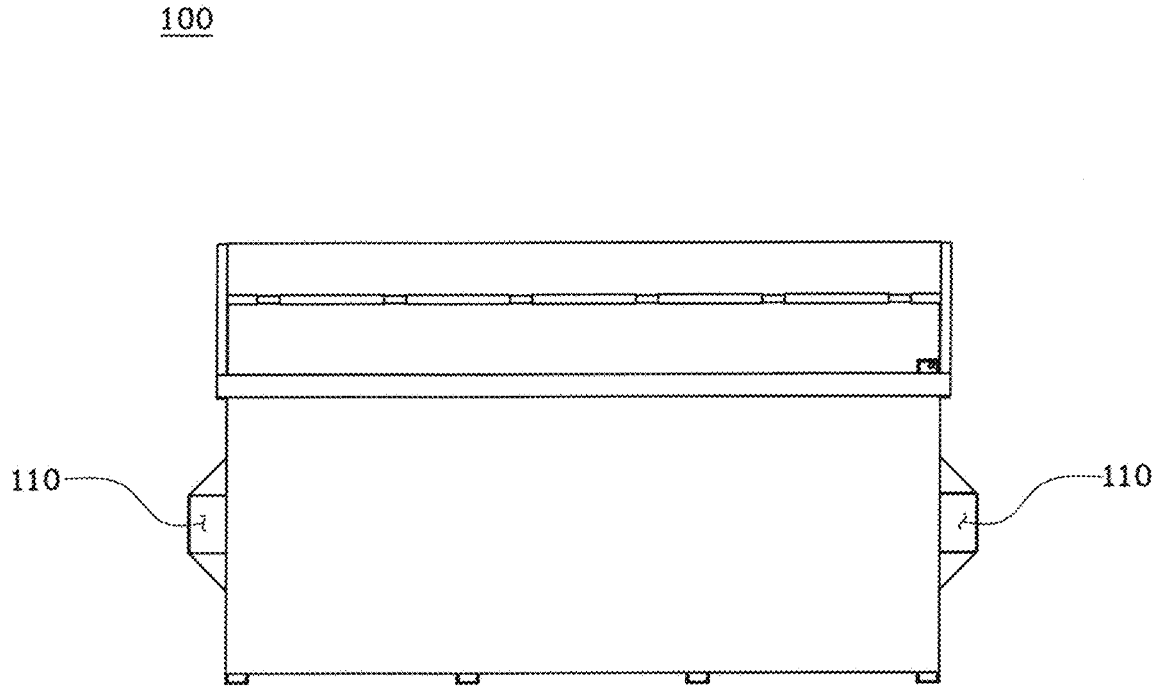
FIG. 2 is a front view of the dumpster in accordance with the exemplary embodiment of the present invention.

FIG. 1 is a perspective view of a dumpster 100 according to an embodiment of the present invention, and FIG. 2 is a front view of the dumpster 100 according to an embodiment of the present invention. In the embodiments, the dumpster 100 is a mobile container for loading waste, and may have a loading space of a predetermined size inside thereof. Here, waste is used in a broad sense including, for example, not only commercial waste discharged from offices, stores, buildings, etc. but also industrial waste such as piles of scrap metal waste, piles of construction cement, etc., marine waste, household waste, etc.

As shown in FIGS. 1 and 2, the dumpster 100 according to an embodiment of the present invention may include a dumpster hole 110 and a sensor module 120.

The dumpster hole 110 is provided on both sides of the dumpster 100 and a front loader 220 of a waste collection vehicle 200 described below is inserted into the dumpster hole 110. The dumpster hole 110 may be formed on each of both sides of the dumpster 100 and may be extended in a direction from the front surface to the back surface of the dumpster 100 by a predetermined length. The dumpster hole 110 may have a square cross-section, but this is only an example, and a cross-sectional shape, cross-sectional size, extension length, etc. of the dumpster hole 110 may vary depending on a size, type, etc. of the dumpster 100.

The sensor module 120 is provided on the dumpster 100 and acquire various information related to the movement of the dumpster 100 or waste inside the dumpster 100. As described below, the sensor module 120 may include a first sensor module that detects an impact or vibration applied to the dumpster 100, a second sensor module that detects an inclination of the dumpster 100, a third sensor module that detects a loading amount of waste loaded in the dumpster 100, and a communication module for transmitting sensor data and loading images to a server (not shown), etc.

Figure 3:
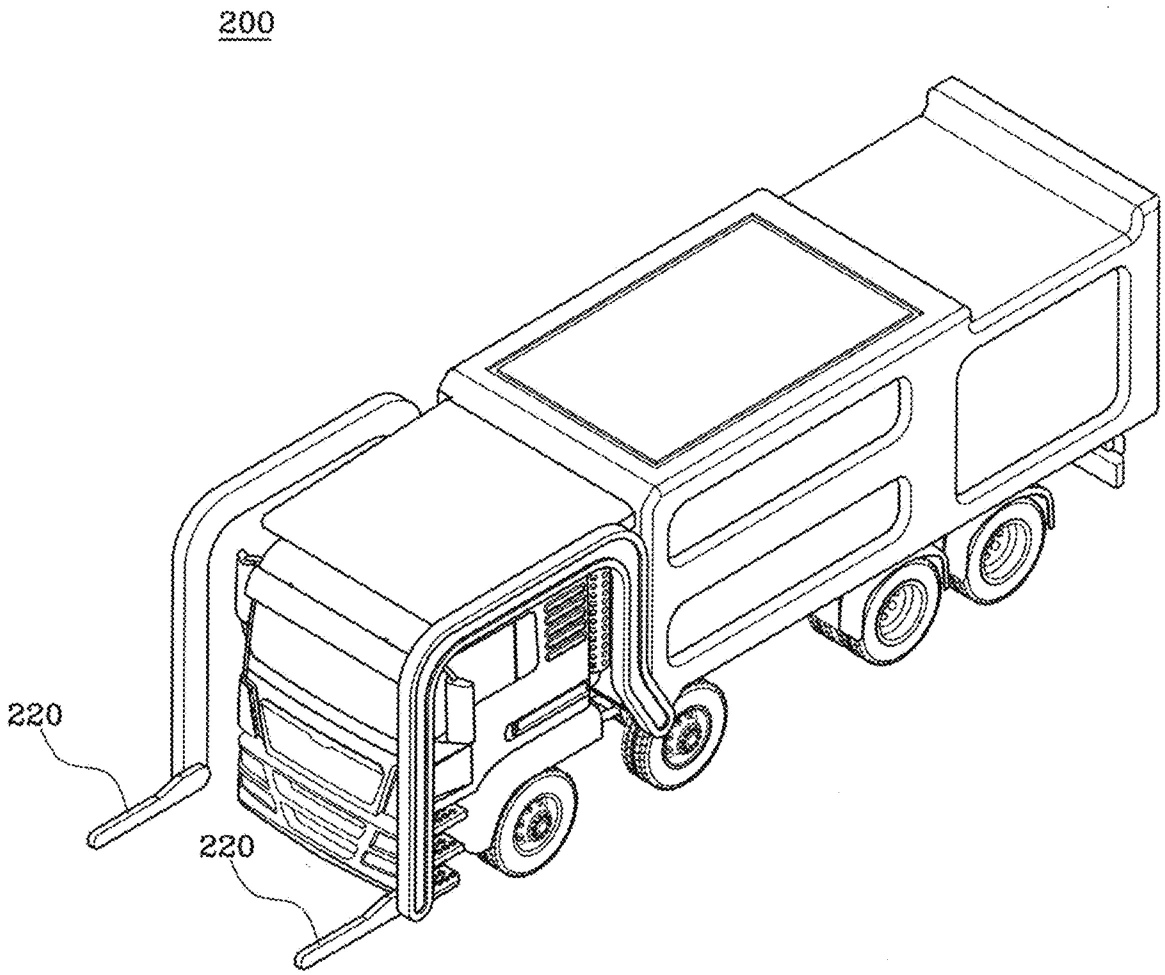
FIG. 3 is a perspective view of a waste collection vehicle in accordance with another exemplary embodiment of the present invention.

FIG. 3 is a perspective view of a waste collection vehicle 200 according to an embodiment of the present invention. In the present embodiments, the waste collection vehicle 200 may collect the dumpster 100 according to the worker's operation, but is not limited thereto, and may be a vehicle-type robot that recognizes the dumpster 100 on its own and performs unmanned autonomous collection of the dumpster 100 without the worker's operation.

As shown in FIG. 3, the waste collection vehicle 200 may be provided with a front loader 220.

The front loader 220 is a means for lifting the dumpster 100 by being inserted into the dumpster hole 110 and is formed so that its end protrudes toward the front of the waste collection vehicle 200. The front loader 220 may be positioned on each of both sides of the waste collection vehicle 200 so as to correspond to the position of the dumpster hole 110, and may lift the dumpster 100 while its end is docked to the dumpster hole 110. The end of the front loader 220 may have a size and an extension length corresponding to the dumpster hole 110 so as to be inserted into the dumpster hole 110.

Figure 4:
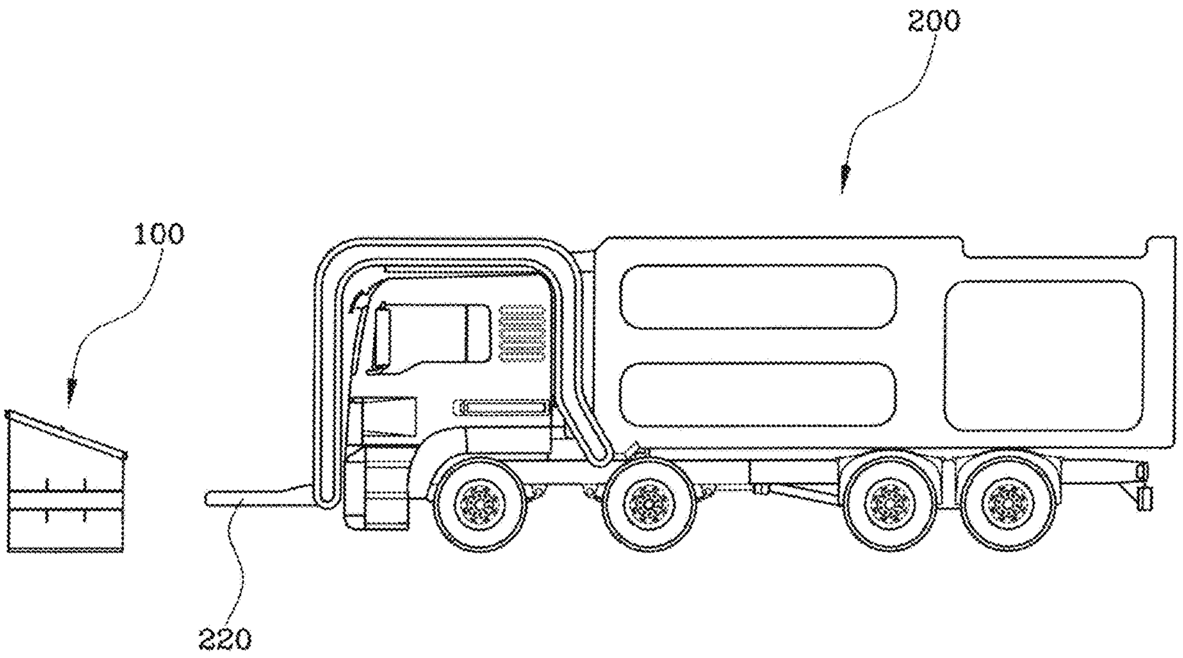
FIG. 4 is an exemplary diagram showing a collection work of the dumpster by the waste collection vehicle in accordance with still another exemplary embodiment of the present invention.
Figure 5:
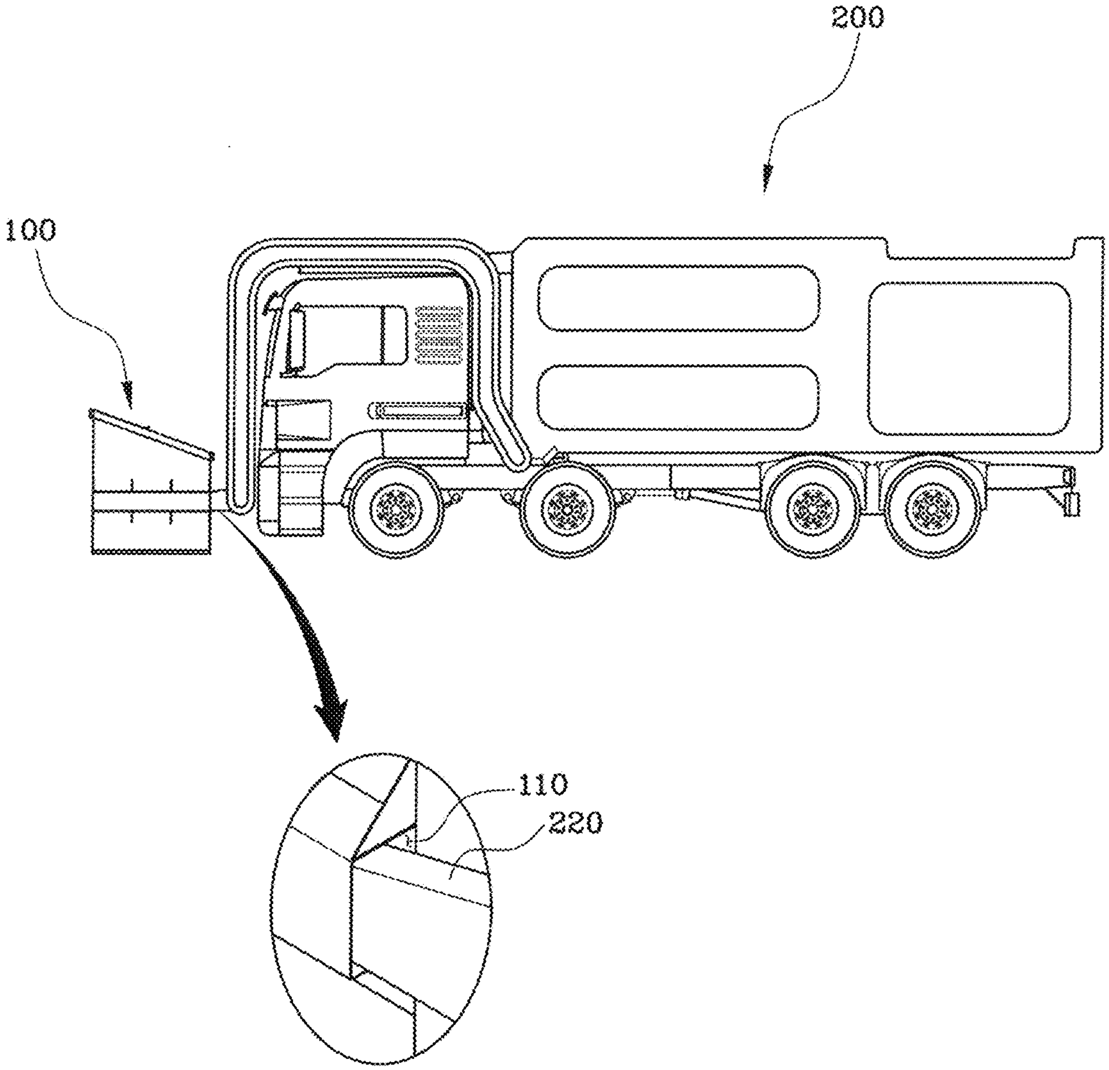
FIG. 5 is an exemplary diagram showing the collection work of the dumpster by the waste collection vehicle in accordance with still another exemplary embodiment of the present invention.
Figure 6:
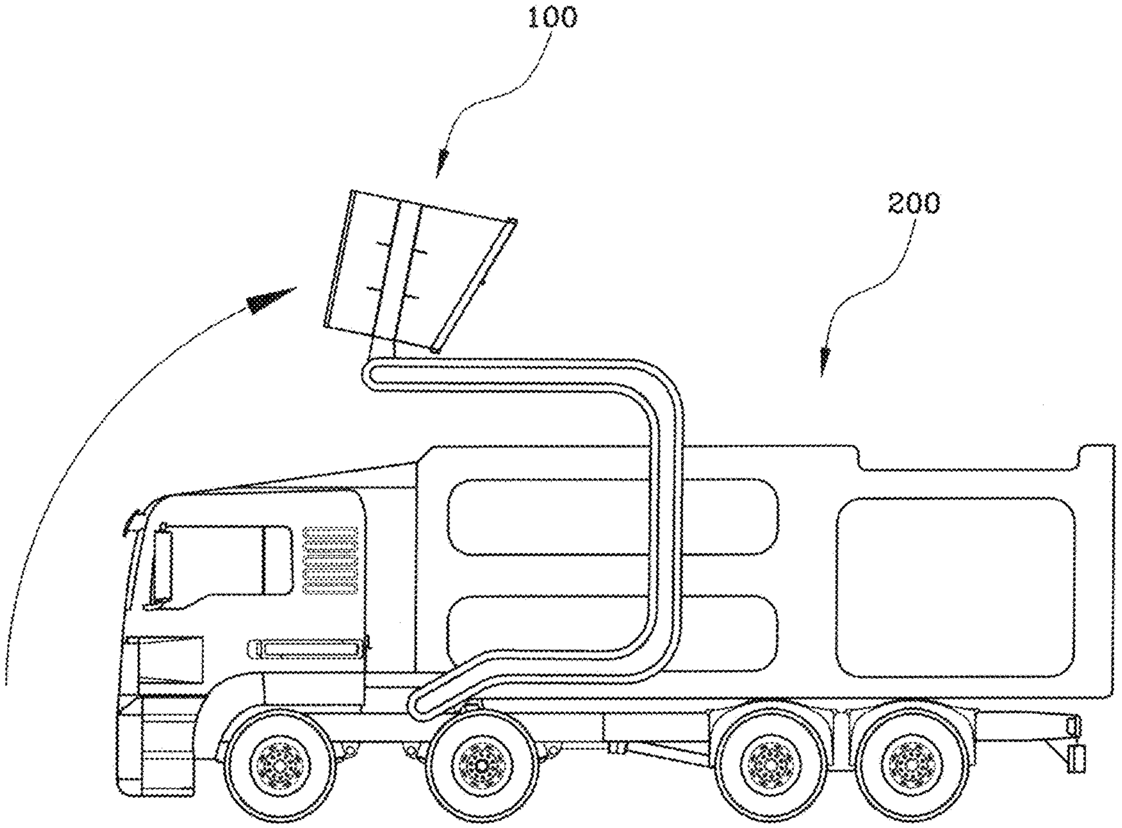
FIG. 6 is an exemplary diagram showing the collection work of the dumpster by the waste collection vehicle in accordance with still another exemplary embodiment of the present invention.

FIGS. 4 to 6 are exemplary diagrams showing a collection work of the dumpster 100 by the waste collection vehicle 200 according to an embodiment of the present invention.

Referring to FIG. 4, the waste collection vehicle 200 may be accurately aligned toward the front of the dumpster 100 for the collection work of the dumpster 100. As an example, a worker may align the waste collection vehicle 200 toward the front of the dumpster 100 by driving and steering the waste collection vehicle 200.

Referring to FIG. 5, when the waste collection vehicle 200 is aligned toward the front of the dumpster 100, the end of the front loader 220 may be docked to the dumpster hole 110. As an example, the worker may move the waste collection vehicle 200 forward and insert the end of the front loader 220 into the dumpster hole 110.

Referring to FIG. 6, the dumpster 100 may be lifted by the waste collection vehicle 200 while the end of the front loader 220 is docked to the dumpster hole 110. As an example, the waste collection vehicle 200 may lift the dumpster 100 according to the worker's operation and empty the waste in the dumpster 100 into a bin (not shown) in the waste collection vehicle 200, or load the dumpster 100 onto the waste collection vehicle 200.

In this way, the collection work of the dumpster 100 may be performed through the alignment of the waste collection vehicle 200, docking of the front loader 220, and lifting of the dumpster 100 by the waste collection vehicle 200. In this case, the different types of sensors included in the sensor module 120 of the dumpster 100 may operate sequentially as the collection work of the dumpster 100 by the waste collection vehicle 200 described above is performed. Hereinafter, a detailed configuration of the sensor module 120 and a process of sequentially controlling the sensors in the sensor module 120 as the collection work of the dumpster 100 by the waste collection vehicle 200 is performed will be described in detail.

Figure 7:
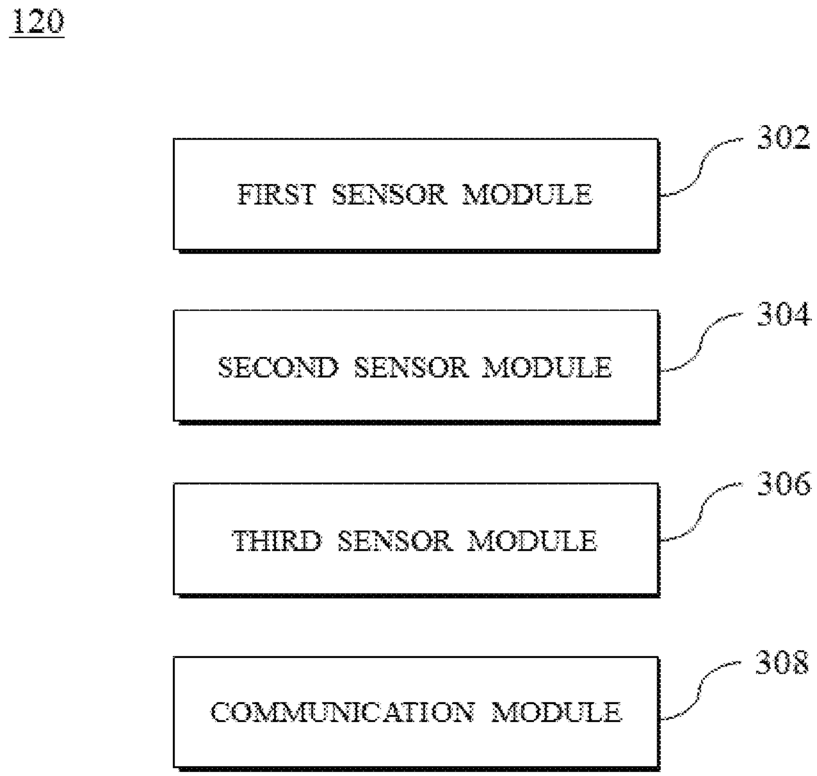
FIG. 7 is a block diagram showing a detailed configuration of a sensor module in accordance with still another exemplary embodiment of the present invention.
Figure 8:
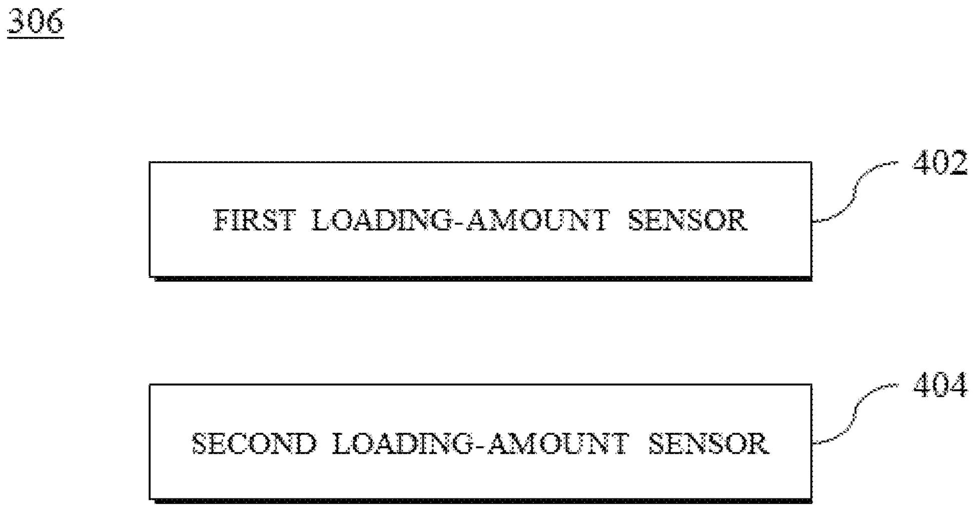
FIG. 8 is a block diagram showing a detailed configuration of a third sensor module in accordance with still another exemplary embodiment of the present invention.

FIG. 7 is a block diagram showing a detailed configuration of the sensor module 120 according to an embodiment of the present invention, and FIG. 8 is a block diagram showing a detailed configuration of a third sensor module 306 according to one embodiment of the present invention.

Referring to FIGS. 7 and 8, the sensor module 120 according to an embodiment of the present invention includes a first sensor module 302, a second sensor module 304, the third sensor module 306, and a communication module 308. This sensor module 120 may be provided on the dumpster 100. For example, the sensor module 120 may be provided on an inner surface of the dumpster 100. In addition, the first sensor module 302, the second sensor module 304, the third sensor module 306, and the communication module 308 are components of the sensor module 120 and may be configured as integrated with each other, but are not limited thereto. The first sensor module 302, the second sensor module 304, the third sensor module 306, and the communication module 308 may be provided at different locations, and in this case, the components may be electrically interconnected to each other.

The first sensor module 302 is a sensor that detects an impact or vibration applied to the dumpster 100, and may be, for example, an impact sensor, a vibration sensor, etc.

The second sensor module 304 is a sensor that detects an inclination of the dumpster 100, and may be, for example, an inclination sensor.

The third sensor module 306 is a sensor that detects a loading amount of waste loaded in the dumpster 100, and may include a first loading-amount sensor 402 and a second loading-amount sensor 404.

The first loading-amount sensor 402 may include at least one of an infrared sensor, an ultrasonic sensor, and a Time of Flight (ToF) sensor.

The second loading-amount sensor 404 is a sensor that photographs waste in the dumpster 100 to acquire a loading image, and may be, for example, a camera.

The communication module 308 transmits sensor data acquired from the first loading-amount sensor 402 and the loading image acquired from the second loading-amount sensor 404 to the server. In addition, the communication module 308 may transmit, in addition to the sensor data and loading images, additional information such as identification information of the dumpster 100, temperature of a loading space in the dumpster 100, voltage of the battery in the dumpster 100, battery status, etc., to a server.

Here, the sensor data may be, for example, infrared data, ultrasonic data, ToF data, etc., and the loading image may be an image of the waste loaded in the dumpster 100. The server may determine whether the collection work of the dumpster 100 has been performed normally using the sensor data and loading images. As an example, the server may compare the infrared data included in the sensor data with previously learned infrared data (e.g., infrared data in a state where the dumpster is full of waste, infrared data in a state where the dumpster is empty of waste, etc.) to determine whether the dumpster 100 is full of waste or empty of waste. As another example, the server may compare the loading image with a previously learned loading image (e.g., a loading image in a state where the dumpster is full of waste, loading image in a state where the dumpster is empty of waste, etc.) to determine whether the dumpster 100 is full of waste or empty of waste. In this way, the server may double-check whether the collection work of the dumpster 100 has been performed normally by using different types of pieces of loading amount-related data, i.e., sensor data acquired from the first loading-amount sensor 402, and the loading image acquired from the second loading sensor 404, respectively. The server may monitor the collection work of the dumpster 100 by the waste collection vehicle 200 based on data collected from the dumpster 100, and may provide objective data (e.g., sensor data and loading images before and after the collection work, collection time, location of the dumpster 100, etc.) on whether the collection work is completed to a customer (i.e., a discharger). If the determination results on whether the collection work is completed based on the sensor data and loading images are different (e.g., if the collection work is not performed normally according to the sensor data, but the collection work is performed normally according to the loading images), the server may determine that an error has occurred in one of the first loading-amount sensor 402 and the second loading-amount sensor 404 and request the worker to check these sensors.

In this case, the first sensor module 302, the second sensor module 304, the third sensor module 306 and the communication module 308 described above may operate sequentially as the collection work by the waste collection vehicle 200 is performed while the end of the front loader 200 is docked to the dumpster hole 110. This will be described in detail below with reference to FIG. 9.

Figure 9:
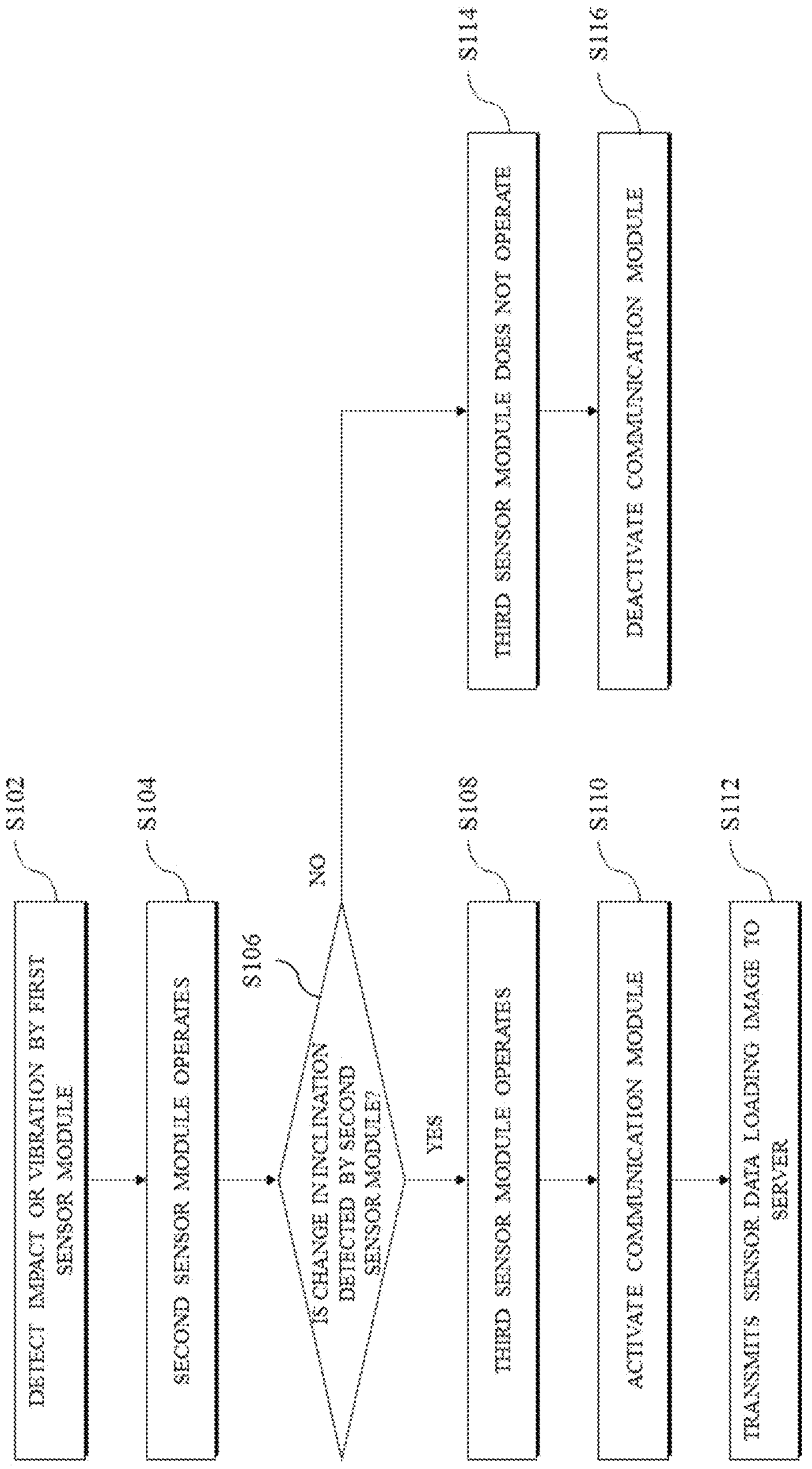
FIG. 9 is a flowchart for describing a method for detecting collection work in accordance with still another exemplary embodiment of the present invention.

FIG. 9 is a flowchart for describing a method for detecting a collection work according to an embodiment of the present invention. In the illustrated flowchart, the above method is described as being divided into a plurality of steps, but at least some of the steps may be performed in a different order, combined with other steps to be performed together, omitted, divided into sub-steps to be performed, or performed by being added with one or more steps (not shown).

In step S102, an impact or vibration of which magnitude is greater than or equal to a level set by the first sensor module 302 is detected. As described above, the first sensor module 302 may be, for example, an impact sensor, a vibration sensor, etc. The first sensor module 302 may operate in an operating mode at all times.

In step S104, the second sensor module 304 maintains the sleep mode (or standby mode) and switches to the operating mode when an impact or vibration of which magnitude is greater than or equal to a level set by the first sensor module 302 is detected to detect the inclination of the dumpster 100. The second sensor module 304 may minimize power usage by maintaining the sleep mode except for the set wake-up time zone (or when waking up upon the occurrence of a specific event), but may switch to the operating mode when an impact or vibration of which magnitude is greater than or equal to a level set by the first sensor module 302 is detected to detect the inclination of the dumpster 100. That is, the second sensor module 304 may be triggered to switch to the operating mode when an impact or vibration of which magnitude is greater than or equal to a level set by the first sensor module 302 is detected. If the impact or vibration of which magnitude is greater than or equal to a level set by the first sensor module 302 is not detected, the second sensor module 304 maintains the sleep mode and does not operate.

In step S106, the second sensor module 304 detects a change in inclination of the dumpster 100. That is, the second sensor module 304 may detect a change in inclination of the dumpster 100 in each of the X-axis, Y-axis, and Z-axis directions. Specifically, the second sensor module 304 may detect a change in inclination of the dumpster 100 in each of the X-axis, Y-axis, and Z-axis directions, respectively, by measuring displacement values of the dumpster 100 in each of the X-axis, Y-axis, and Z-axis directions. When the collection work of the dumpster 100 by the waste collection vehicle 200 is performed, since the dumpster 100 is lifted by the waste collection vehicle 200, the change in inclination of the dumpster 100 occurs in each of the X-axis, Y-axis, and Z-axis directions. If the change in inclination of the dumpster 100 in each of the X-axis, Y-axis, and Z-axis directions is detected by the second sensor module 304, step S108 is performed.

In step S108, the third sensor module 306 maintains the sleep mode, and switches to the operating mode when the change in inclination of the dumpster 100 is detected by the second sensor module 304 to detect the loading amount of waste loaded in the dumpster 100. In this time, the third sensor module 306 may switch to the operating mode only when the change in inclination of the dumpster 100 in each of the X-axis, Y-axis, and Z-axis directions is detected by the second sensor module 304 to detect the loading amount of waste loaded in the dumpster 100. That is, the third sensor module 306 may minimize power use by maintaining the sleep mode except for the set wake-up time zone, but switch to the operating mode when the change in inclination of the dumpster 100 is detected by the second sensor module 304 to detect the loading amount of waste loaded in the dumpster 100. In this way, the third sensor module 306 may be triggered to switch to the operating mode as the change in inclination of the dumpster 100 is detected by the second sensor module 304.

As described above, the third sensor module 306 may include the first loading-amount sensor 402 and the second loading-amount sensor 404. When the third sensor module 306 is switched to the operating mode, sensor data and loading images may be acquired through the first loading-amount sensor 402 and the second loading-amount sensor 404, respectively. In this case, the first loading-amount sensor 402 and the second loading-amount sensor 404 may be switched to the operating mode after a set time (e.g., approximately 10 minutes) has elapsed after the change in inclination of the dumpster 100 is detected by the second sensor module 304 or when it is determined that the collection work of the dumpster 100 by the waste collection vehicle 200 is completed (i.e., when the change in inclination of the dumpster 100 is not detected after the dumpster 100 is lifted) to detect the loading amount of wasted loaded in the dumpster 100. For example, when an inclination (or a displacement value) of the dumpster 100 is detected to have returned to its original state after the change in inclination of the dumpster 100 is detected by the second sensor module 304, the third sensor module 306 may be switched to the operating mode to detect the loading amount of waste loaded in the dumpster 100. In this case, since the collection work of the dumpster 100 by the waste collection vehicle 200 has been completed, the third sensor module 306 may acquire the sensor data and the loading image immediately after the collection work of the dumpster 100 has been completed.

In step S110, the communication module 308 is activated as a change in inclination of the dumpster 100 is detected by the second sensor module 304. That is, the communication module 308 does not communicate with the server when the change in inclination of the dumpster 100 is not detected by the second sensor module 304, and communicates with the server only when the change in inclination of the dumpster 100 is detected by the second sensor module 304.

In step S112, the communication module 308 is activated as the the change in inclination of the dumpster 100 is detected by the second sensor module 304, and transmits the sensor data acquired from the first loading-amount sensor 402 and the loading images acquired from the second loading-amount sensor 404 to the server. As described above, the server may determine whether the collection work of the dumpster 100 has been performed normally using the sensor data and loading images.

Meanwhile, when the change in inclination of the dumpster 100 is not detected by the second sensor module 304 in step S106, steps S114 and S116 are performed. That is, when the change in inclination of the dumpster 100 is not detected by the second sensor module 304, the third sensor module 306 does not operate, and the communication module 308 also remains in a deactivated state. As an example, when an impact or vibration of which magnitude is greater than or equal to a level set on the dumpster 100 is detected but no change in inclination of the dumpster 100 is detected, it is determined that the collection work by the waste collection vehicle 200 is not performed normally, and the third sensor module 306 does not operate, and the communication module 308 also remains in a deactivated state. In this case, unnecessary power waste due to the operation of the third sensor module 306 and the communication module 308 can be prevented. In particular, in this case, since the communication module 308 does not transmit and receive unnecessary data to and from a remote server, excessive power usage can be prevented, thereby minimizing the battery (not shown) usage in the dumpster 100.

Figure 10:
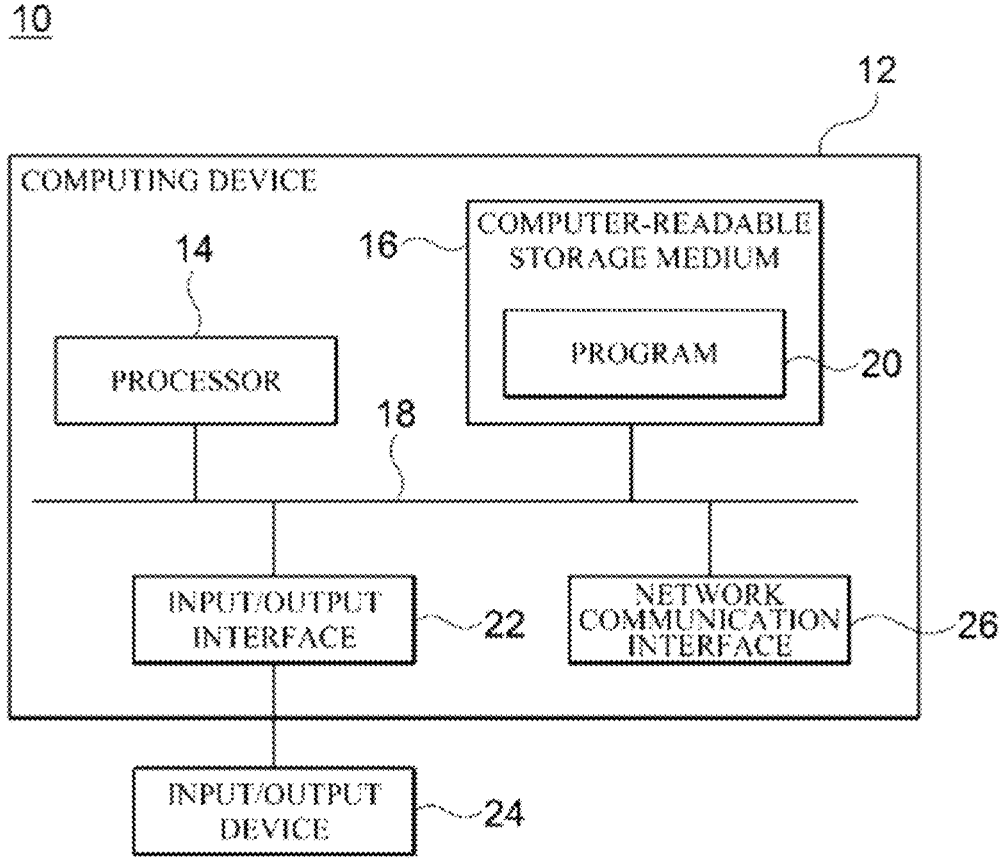
FIG. 10 is a block diagram for describing a computing environment including a computing device suitable for use in exemplary embodiments.

FIG. 10 is a block diagram for illustratively describing a computing environment including a computing device according to an embodiment. In the illustrated embodiment, respective components may have different functions and capabilities other than those described below, and may include additional components in addition to those described below.

The illustrated computing environment 10 includes a computing device 12. In one embodiment, the computing device 12 may be one or more components included in the dumpster 100 or the sensor module of the dumpster 100.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In an embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output device 24 may be connected to other components of the computing device 12 through the input/output interface 22. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present invention, as the collection work of the dumpster by the waste collection vehicle is performed, the operations of the low-power sensors in the dumpster are sequentially controlled, thereby preventing excessive power use of the low-power sensors and detecting whether the irregular collection work is being performed at any time as it comes. In addition, in this case, by securing data immediately after the collection work acquired by various types of sensors, objective data on whether the collection work has been actually performed normally can be secured more efficiently.

Although the method for detecting collection work and the dumpster for executing the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A dumpster that is provided with a plurality of different types of sensors and detects collection work by a waste collection vehicle using the sensors, the dumpster comprising:

a sensor module that comprises a first sensor module detecting an impact or vibration applied to the dumpster, a second sensor module detecting an inclination of the dumpster, and a third sensor module detecting a loading amount of waste loaded in the dumpster; and a dumpster hole that is provided on both sides of the dumpster and to which an end of a front loader provided on the waste collection vehicle is docked in a collection work by the waste collection vehicle, wherein the first sensor module to the third sensor module sequentially operate as the collection work by the waste collection vehicle is performed while the end of the front loader is docked to the dumpster hole, the first sensor module operates in an operation mode at all times, the second sensor module maintains a sleep mode except for a wake-up time zone, and switches to an operating mode when an impact or vibration of which magnitude is greater than or equal to a level set by the first sensor module is detected to detect the inclination of the dumpster, the third sensor module comprises a first loading-amount sensor including at least one of an infrared sensor, an ultrasonic sensor, and a time of flight (ToF) sensor and a second loading-amount sensor that photographs the waste in the dumpster and obtains a loading image, the third sensor module switches to an operating mode only when the change in inclination of the dumpster in each of the X-axis, Y-axis, and Z-axis directions is detected by the second sensor module to detect the loading amount of waste loaded in the dumpster, the sensor module further comprises a communication module for transmitting sensor data acquired by the first loading-amount sensor and the loading image acquired by the second loading-amount sensor to a server, the communication module is activated only when the change in inclination of the dumpster in the X-axis, Y-axis, and Z-axis directions is detected by the second sensor module, so that the sensor data and the loading image are transmitted to the server, and the server determines whether the collection work is completed through the sensor data and the loading image, and when the determination results of whether the collection work is completed through the sensor data and the loading image are different, it is determined that an error has occurred in one of the first loading-amount sensor and the second loading-amount sensor.

2. A method for detecting collection work of a dumpster including a plurality of different types of sensors by a waste collection vehicle, the method comprising:

providing a sensor module that comprises a first sensor module detecting an impact or vibration applied to the dumpster, a second sensor module detecting an inclination of the dumpster, and a third sensor module detecting a loading amount of waste loaded in the dumpster on the dumpster;

providing a dumpster hole on both sides of the dumpster;

docking an end of a front loader provided on the waste collection vehicle to the dumpster hole; and sequentially operating the first sensor module to the third sensor module as the collection work by the waste collection vehicle is performed while the end of the front loader is docked to the dumpster hole, wherein the first sensor module operates in an operating mode at all times, the second sensor module maintains a sleep mode except for a wake-up time zone, and switches to an operating mode when an impact or vibration of which magnitude is greater than or equal to a level set by the first sensor module is detected to detect the inclination of the dumpster, the third sensor module comprises a first loading-amount sensor including at least one of an infrared sensor, an ultrasonic sensor, and a time of flight (ToF) sensor and a second loading-amount sensor that photographs the waste in the dumpster and obtains a loading image, the third sensor module switches to an operating mode only when the change in inclination of the dumpster in each of the X-axis, Y-axis, and Z-axis directions is detected by the second sensor module to detect the loading amount of waste loaded in the dumpster, the sensor module further comprises a communication module for transmitting sensor data acquired by the first loading-amount sensor and the loading image acquired by the second loading-amount sensor to a server, the method for detecting collection work further comprises, after the sequentially operating the first sensor module to the third sensor module, activating the communication module only when the change in inclination of the dumpster in the X-axis, Y-axis and Z-axis directions is detected by the second sensor module, so that the sensor data and the loading image are transmitted to the server, the communication module is activated only when the change in inclination of the dumpster in the X-axis, Y-axis, and Z-axis directions is detected by the second sensor module, so that the sensor data and the load image may be transmitted to the server, and the server determines whether the collection work is completed through the sensor data and the loading image, and when the determination results of whether the collection work is completed through the sensor data and the loading image are different, it is determined that an error has occurred in one of the first load amount sensor and the second load amount sensor.

* * * * *